Jan. 26, 1971  RYOJI UCHIYAMA  3,558,244
HIGH PRESSURE PUMP
Filed Sept. 3, 1968
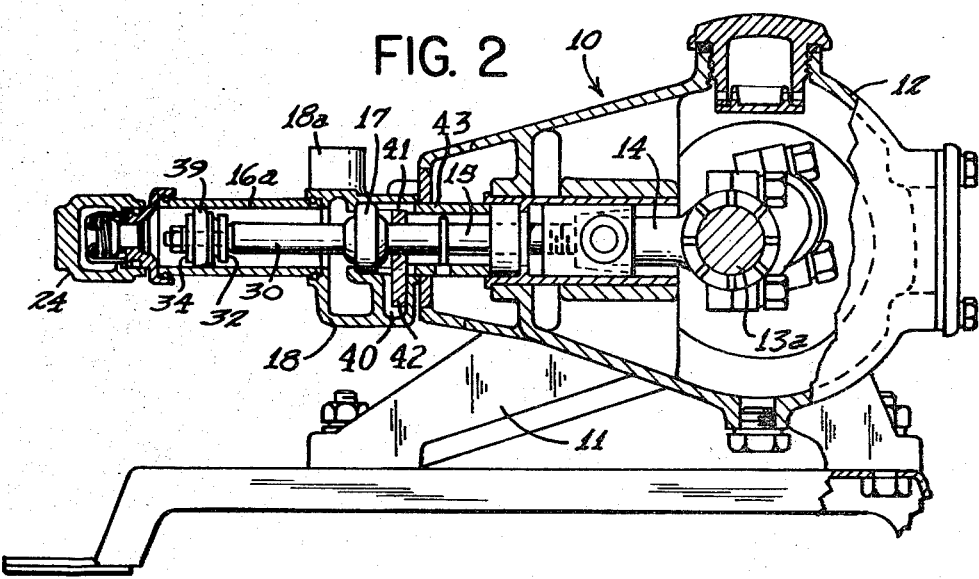
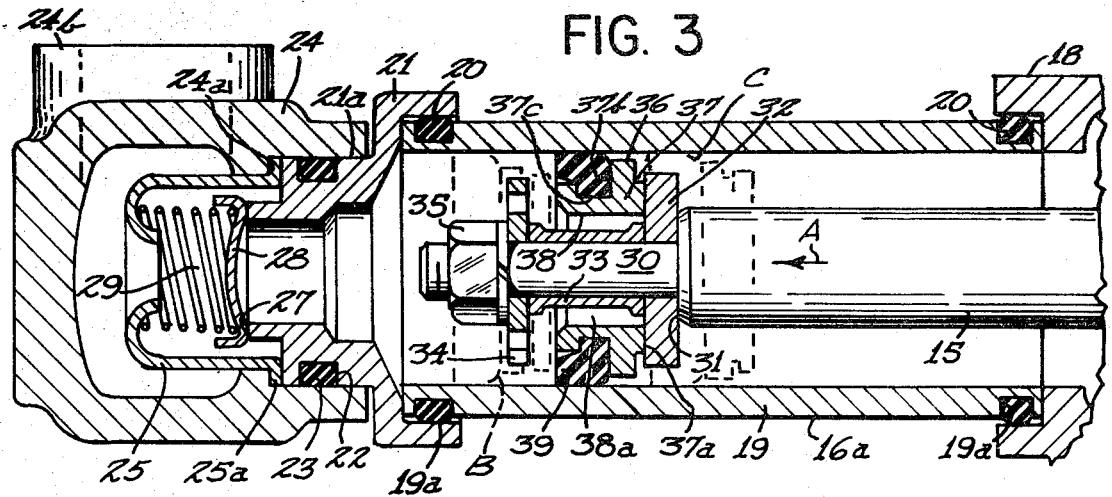
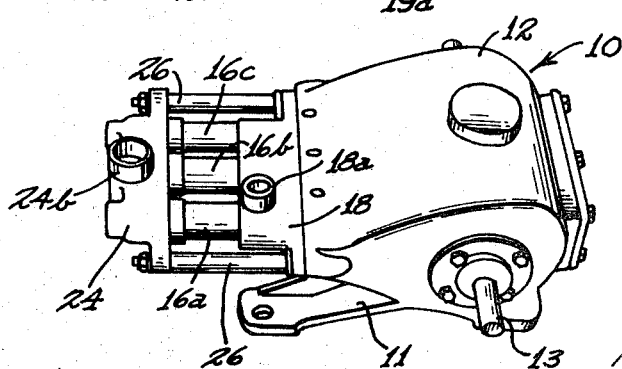
INVENTOR
RYOJI UCHIYAMA
BY
Williamson, Palmatier & Bains
ATTORNEYS

United States Patent Office 3,558,244
Patented Jan. 26, 1971

3,558,244
HIGH PRESSURE PUMP
Ryoji Uchiyama, Ichikawa, Japan, assignor to Maruyama Mfg. Co., Ltd., Tokyo, Japan
Filed Sept. 3, 1968, Ser. No. 756,852
Int. Cl. F16n 7/12; F16j 11/04; F04b 7/00
U.S. Cl. 417—511    1 Claim

ABSTRACT OF THE DISCLOSURE

A high pressure pump with a self-centering piston loose on the piston rod carrying valve valving in cooperation with the piston.

BRIEF DESCRIPTION OF INVENTION

In this high pressure reciprocating pump, the piston is freely carried on the rod to be completely self-centering in the cylinder, and to operate with a valve on the reciprocating rod. As a result the wear on the piston cup, which is lubricated on both sides in the cylinder, is minimal and uniform around the entire periphery. The piston cup is simply mounted in a groove of the self-centering piston, without any rigid clamping or other fastening, so as to adjust itself on its mounting and thereby minimize wear on the piston cup. Any wear on the piston cup occurs all along the outer cylinder-engaging surface so that no leakage occurs in spite of the wearing. The cylinder wall is removable and reversible to accommodate the piston and piston cup in either end; therefore the cylinder wall essentially incorporates integral a spare cylinder to replace any worn cylinder wall because the stroke of the piston is less than one-half the length of the cylinder and is confined within only one-half of the cylinder. Similarly, the inlet valve is disc shaped to be reversible for use as a valve.

These and other objects and advantages of my invention will more fully appear from the following description made in connection with accompanying drawing, wherein like reference characters refer to the same or similar parts throughout the several views, and in which:

FIG. 1 is a perspective view of the pump.

FIG. 2 is a section view of the pump through one of the operating cylinders.

FIG. 3 is an enlarged detail section of one of the cylinders.

One form of the invention is shown in the drawings and is described herein.

The high pressure pump is indicated in general by numeral 10 and has a base 11, and a crankshaft housing 12 mounting the main shaft 13 which is connectable to a high speed source of rotary power, such as an electric motor. It is preferred that the shaft 13 be rotated at an approximate rate of 525 to 810 r.p.m. The main drive shaft 13 incorporates a crankshaft 13a, driving pitmans 14 which are connected to piston rods 15 in each of the cylinders 16a, 16b and 16c. The piston rods 15 extend through seals 17 and through the liquid inlet manifold 18 and into a respective cylinder such as 16a illustrated in FIG. 3. The inlet manifold 18 has a threaded connection 18a adapted for connection to an inlet pipe or hose for supplying liquid to the pump. Each of the cylinders 16a, 16b and 16c has a cylinder wall 19 which is identical at its opposite ends and is provided at each end with a groove 19a for the sealing ring 20. The opposite ends of the cylinder wall 19 are sealed through the ring 20 with the inlet manifold 18, and an outlet fitting 21 which telescopically receives the corresponding end of the cylinder wall therein. The outlet fitting 21 has a reduced annular surface 21a with a sealing ring groove 22 therein for the sealing ring 23 which bears against the inner periphery of the outlet manifold 24. The outlet manifold 24 has an interior shoulder 24a on which the flange 25a of the spring retainer 25 rests. The flange 25a bears against the end of the outlet fitting 21, and urges the outlet fitting 21 and the cylinder wall 19 against the inlet manifold 18 under influence of the clamping posts or bolts 26 seen in FIG. 1.

The outlet fitting 21 also has an endwise facing valve seat 27 confronting the check valve element 28 which normally bears against the seat 27 under influence of the spring 29 carried by the retainer 25. It will be noted that when liquid under pressure is supplied through the outlet fitting 21, the valve element 28 will unseat and allow the liquid to flow through the spring retainer 25 and through the outlet manifold which will be connected to a hose and nozzle at the boss 24b.

Each of the piston rods 15 has a reduced end portion 30 and an adjoining shoulder surface 31 with a demountable valve element 32 normally held firmly against the shoulder 31. A retaining sleeve 33 encompasses the reduced portion 30 of the rod and clamps the valve element 32 in fixed position. An apertured disc 34 also is mounted on the reduced portion 30 of the rod and retains the sleeve in a fixed position thereon. The end of the reduced portion 30 of the rod is threaded, and a nut and washer 35 clamps the apertured disc 34 in stationary position against the sleeve 33 so as to maintain the valve element 32 in fixed position.

The rod 15 carries a piston 36 which has a piston body 37, one end 37a of which is ground flat to provide a valve seat for valve element 32. The piston body 37 has an enlarged bore 38 at its interior which is considerably larger than the outside diameter of the sleeve 33 so as to provide an enlarged flow passage 38a through the piston.

The piston body 37 also has a shoulder surface 37b facing forwardly toward the outlet manifold 24, and an adjacent annular groove 37c which removably mount the resilient piston cup 39.

In the position shown in FIG. 3, the piston 36 is moving forwardly in the direction of arrow A with the valve element 32 bearing against the valve seat 37a, thereby forcing liquid forwardly through the outlet manifold.

No constriction or check valve is necessary at the inlet side under most circumstances. The piston 36 will move forwardly in the cylinder until the cup 39 reaches the dotted position B seen in FIG. 3. When the direction of the rod 15 thereafter changes, the valve element 32 is moved, by the rod, away from the valve seat 37 on the piston so as to permit flow of liquid through the passage 38a and through the apertures of the disc 32. The valve element 28 is then seated so that as the rod moves opposite direction A, liquid will flow through the passage 38a and to a position forwardly of the piston 36.

It will be seen that the piston 36 is free to move transversely with respect to the rod 15 and maintain a completely concentric relation within the cylinder wall 19 so as to minimize wear on the piston cup. There is liquid on both sides of the piston 36 during the normal operation of the pump, and therefore the piston is completely lubricated by the liquid as it moves forth and back in the cylinder.

In the return or rearward stroke of the piston, the movement of the piston is limited to that indicated by the dotted line position C which indicates the position of the piston cup. It will be understood that the entire length of the stroke of the piston is less than half the length of the cylinder wall 19, and this length of the stroke is confined within one end of the cylinder wall 19; thereby producing any wear that occurs, only in one end of the cylinder wall. The cylinder wall may be reversed, end for end, so as to provide an entirely new operating portion of the cylinder, and the cylinder 19 thereby essentially incorporates a complete spare part within it.

Likewise, the valve element or disc 32 is flat and ground on both sides so that if any wear occurs on the face of it, it may be merely reversed on the rod 15 so as to provide an entirely new valving surface to cooperate with the seat 37a in normal operation.

It should be understood that the crankshaft 13a has its several cranks in angular relation to each other so as to phase the three cylinders of the pump at approximately 120 degrees of the operating cycle from each other. The internal bore of the cylinder wall 19 may be approximately two centimeters in diameter and the pump will convey two to three gallons per minute at 650 pounds per square inch. Because the piston 36 is free of the rod 15, the valving as related to the valve element 32 and the valve seat 37a, is a mechanical operation, and not dependent upon springs or on suction action as in most pumps.

The piston cup 39 has an extensive life without appreciable wear because of the self-centering of the piston 36 and the front and rear lubrication in the cylinder. Further, the piston 36 and the cup 39 is freely rotatable so that the piston may follow the line of least resistance in the cylinder in producing the pumping action. The cup is self-flushing during the intake stroke (opposite to direction A). It has been experienced that in the event of any wear on the piston cup, the wear is along the entire external cylindrical wall of the cup rather than at any one particular point. Such wear is minimal and does not interfere with the efficient operation of the pump.

It should be noted that the seal 17 which permits a reciprocation of rod 30 therethrough is lubricated by the liquid at inlet pressures in the cylinder. The rod 30 is continuously completely immersed in the liquid, and, as a result, a very adequate lubrication is provided between the rod and the seal 17 at the side of the seal which faces the cylinder. The housing defines a well 40 immediately adjacent the seal 17, and for each of the cylinders of the pump. The well 40 will contain a quantity of lubricant, such as a light oil. A ring shaped wick lubricator 41, made of felt or other similar material, is mounted on the piston rod 30 immediately adjacent the seal 17, and there is a loose-fitting relation between the wick lubricator and the rod so that the rod may slide freely therethrough. The wick lubricator has a stem or projection extending downwardly from the ring shaped lubricator and into the well 40 and the lubricant carried therein. The lubricant from the well 40 is carried upwardly so as to lubricate the rod 30 immediately adjacent the seal 17 at this location outside of the cylinders. As a result, lubricant is applied to the rod 30 at both sides of the seal 17. The wick lubricator 41 is retained in the desired position and in well 40 by interior shoulders on tubular member 43 which holds the seal 17 in place.

As a result of lubricating both sides of the seal 17, the life expectancy of this seal is increased many times.

Of course, it will be understood that various changes may be made in the form, details, arrangement and proportions of the various parts without departing from the scope of my invention.

1. A high pressure pump to supply liquid to a nozzle, comprising a cylinder with a liquid inlet at one end and an outlet at the other end, a reciprocating rod extending through a seal at one end of the cylinder and connected with means producing rapid reciprocation of the rod, a pair of spaced discs on the rod in the cylinder, one of said discs being adjacent the outlet and having a plurality of holes therethrough facilitating free passage of liquid, the other of said discs being adjacent the inlet and being imperforate to prohibit passage of liquid therethrough, and also being smaller than the cylinder to permit substantial liquid flow past the edge of the disc, and a piston on the rod between the discs and movable toward and away from said imperforate disc, the piston having a rod-receiving bore with a diameter greatly exceeding the size of the rod to permit free flow of liquid through the piston and to allow the piston to center itself in the cylinder, the piston having a valve seat at the exterior periphery of the bore and confronting the imperforate disc to engage the disc and prevent flow of liquid through the piston, and said disc with holes being engageable with the piston at the exterior of said bore for moving the piston and permitting flow through the holes and bore, said cylinder including a cylindrical wall confining and engaging the piston, said cylindrical wall having identical opposite ends, the cylinder having inlet and outlet fittings removably sealed to the opposite ends of said cylindrical wall, and demountable means retaining said fittings and cylindrical wall together, said piston having a length of stroke less than half the length of said cylindrical wall, and said piston operating within said cylindrical wall and between one end thereof and a point midway between the ends.

References Cited

UNITED STATES PATENTS

| | | | |
|---|---|---|---|
| 1,258,471 | 3/1918 | Blanc | 103—225 |
| 1,291,504 | 1/1919 | Hazard | 184—64 |
| 1,381,224 | 6/1921 | Petricone | 230—190 |
| 1,538,911 | 5/1925 | Taylor | 103—225 |
| 1,557,706 | 10/1925 | Knox | 230—190 |
| 1,798,209 | 3/1931 | Lambert | 103—225 |
| 2,869,231 | 1/1959 | Gury | 184—64 |
| 2,931,313 | 4/1960 | Hughes | 103—178 |
| 2,659,309 | 11/1953 | Holley, Jr. | 103—178 |

FOREIGN PATENTS

| | | | |
|---|---|---|---|
| 616,914 | 1/1949 | Great Britain | 103—178 |

OTHER REFERENCES

Patent Office classification definitions for Class 92, p. 18.

WILLIAM L. FREEH, Primary Examiner

U.S. Cl. X.R.

92—171, 240; 184—64; 417—539